United States Patent [19]
Yamada et al.

[11] Patent Number: 5,551,350
[45] Date of Patent: Sep. 3, 1996

[54] TRANSPORTING SYSTEM DRIVEN BY LINEAR MOTOR HAVING INDUCTIVE POWER SUPPLY

[75] Inventors: Yoshihiko Yamada, Inuyama; Kazuhiro Taguchi, Niwa-gun, both of Japan

[73] Assignee: Daifuku Co., Ltd., Osaka, Japan

[21] Appl. No.: 320,441

[22] Filed: Oct. 7, 1994

[30] Foreign Application Priority Data

| Oct. 7, 1993 | [JP] | Japan | 5-251890 |
| Oct. 7, 1993 | [JP] | Japan | 5-251891 |

[51] Int. Cl.⁶ .................................................. B60L 13/02
[52] U.S. Cl. .................. 104/293; 104/290; 104/88.03; 191/10; 414/279
[58] Field of Search ............................... 104/88.3, 290, 104/291, 292, 293; 191/10; 414/279

[56] References Cited

U.S. PATENT DOCUMENTS

| 5,121,830 | 6/1992 | Sakamoto et al. | 104/290 |
| 5,123,357 | 6/1992 | Fujita et al. | 104/290 |
| 5,135,344 | 8/1992 | Kita et al. | 414/279 |

FOREIGN PATENT DOCUMENTS

| 195644 | 9/1986 | European Pat. Off. | 104/290 |
| 6044403 | 2/1994 | Japan | 191/10 |
| 9324343 | 12/1993 | WIPO | 191/10 |

*Primary Examiner*—S. Joseph Morano
*Attorney, Agent, or Firm*—Schweitzer Cornman & Gross

[57] ABSTRACT

An automated warehouse system a plurality of car passages, and a plurality of transport units, each disposed in a car passage containing parallel rails with vertical webbings, each of the transport units have a car, wheels for running on the rails, a drive for moving the car on the rails, the drive having a linear motor body attached to the car and facing a secondary conductor secured to a rail, a power supplying system for the drive, mounted from one side of the car, and having two parallel induction wires secured to and along a rail, at least one induction coil attached to the car and disposed between the induction wires, the warehouse system further includes the induction wires of each of the transport units being connected in series to one or more common panels.

9 Claims, 5 Drawing Sheets

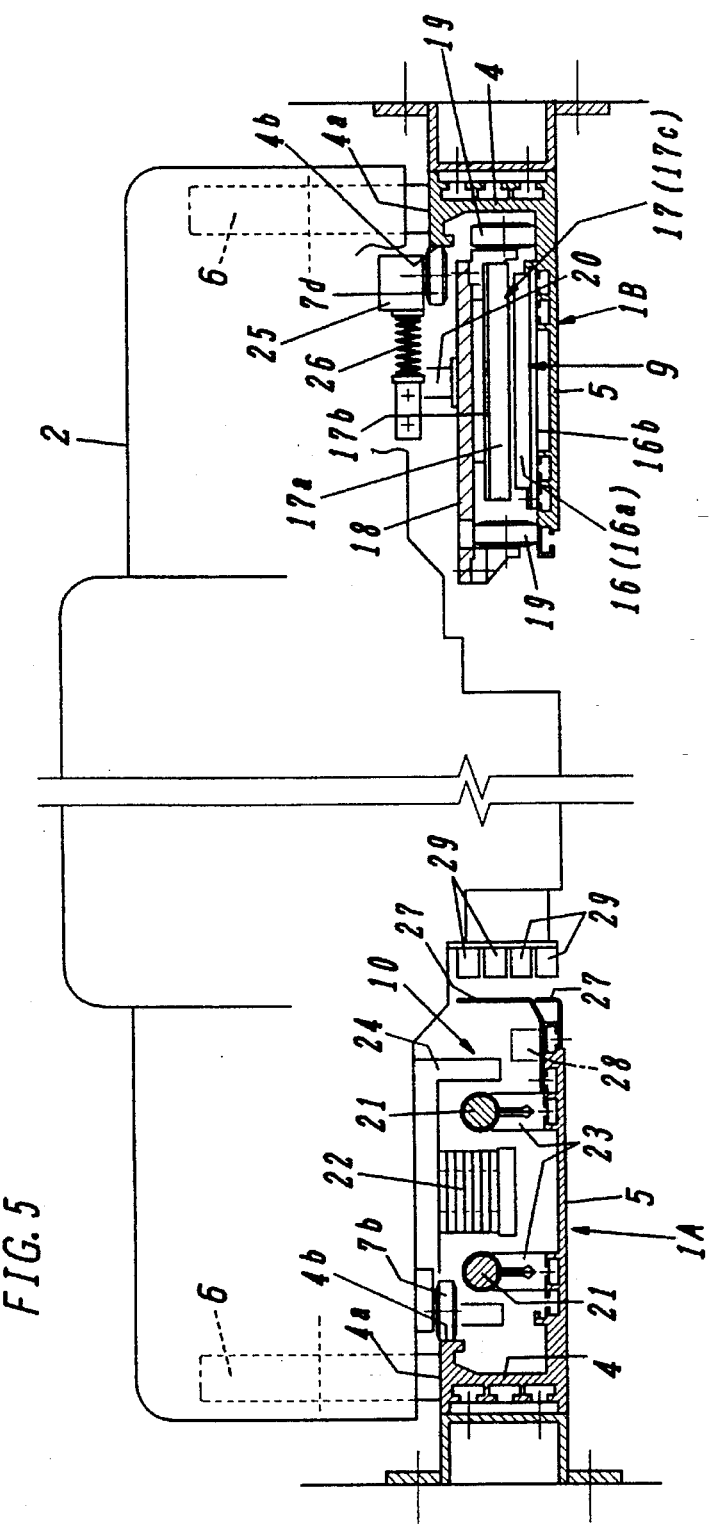

TRANSPORTING SYSTEM DRIVEN BY LINEAR MOTOR HAVING INDUCTIVE POWER SUPPLY

FIELD OF THE INVENTION

The present invention relates to a transporting system in which an electric car is used for transportation of goods, wherein the electric car is guided along a pair or guide rails in an automated warehouse.

BACKGROUND OF THE INVENTION

In conventional warehouse transporting systems, a shelving and unshelving and transporting electric car travels on rails installed along a car passage between adjacent racks. Generally in the driving system employed in the known transporting systems, an electric motor drives the traction wheels of the transporting electric car. The power supply for the electric car includes an electric line extending along the car passage and a collector on the car in a sliding contact with the line.

In such conventional transporting systems, the traction wheel drive and the power supply system had numerous problems. For example, the electric car makes considerable noise when it moves, even though it cannot run fast. Due to the dust produced by such supply systems and other obstacles, there is often a failure of smooth and constant supply of electric current to the car.

The noise of the car can be reduced and its speed can be increased by employing a linear motor body mounted on and attached to the car and cooperating with a secondary conductor secured along the passage. The motor body must be separated at all times by a predetermined small clearance from the secondary conductor. Abrasion of the outer periphery of the wheels and/or any obstacle intervening between any running wheel and the running surface of the passage will result in a variation in the effective height of the electric car and particularly of the linear motor body whereby the required clearance cannot be maintained or in a worst case the linear motor body could even directly contact the secondary conductor.

The aforementioned drawbacks of the prior art systems can also be resolved in another way. An induction wire line (such as a wire known as the "litz" wire) can be installed in an along each car passage, as a noncontact type power source, with at least one induction coil being carried by the car. When many car passages are used, one above another, in a multi-level automated warehouse, each car passage requires a panel for power supply, thereby noticeably raising construction costs.

SUMMARY OF THE INVENTION

It is a first object of the present invention to provide a transportation system which operates in a reliable quiet, fast, effective manner and to keep a clean environment around the system.

It is another object of the present invention to provide a transportation system comprising an electric car equipped with a linear motor body to cooperate with a secondary conductor along a car passage to form a drive in which a small constant clearance is maintained between the motor body and the conductor.

It is yet another object of the present invention to provide a transportation system employable in a multi-level, automatic warehouse which has a plurality of car passages one above another so that an effective but inexpensive power supply system is provided for driving electric car along the passages to shelve or unshelve goods stored in the warehouse.

The above objects are accomplished by the present invention with a transportation system having a pair of parallel guide rails, an electric car having wheels supported by the rails and guided therealong, a drive for the electric car, and a power supplying system for the drive system, wherein the drive comprises a secondary conductor horizontally secured from one of the guide rails and a linear motor body on the electric car facing the secondary conductor, and wherein the power supplying system has a pair of induction wire lines horizontally secured parallel to each other and along the other guide rail and at least one induction coil intervening therebetween, with the induction coil being attached to the electric car.

The car suitably has two pairs of positioning rollers arranged along and transversely of the car. A vertical shaft rotatably supports each positioning roller to maintain a rotational contact with an inner vertical surface of an adjacent guide rail. Two positioning rollers are located in a fixed transverse position on the car adjacent to the guide rail with the pair of induction wires along side. The other two rollers are located on the side of the guide rail that is adjacent the other guide rail with the driving system extending along it and are horizontally movably urged against that guide rail by springs.

Each guide rail suitably has an L-shaped cross section and is composed of a vertical web portion secured to a fixed supporting member, and a horizontal rail portion extending from the lower end of the vertical portion. Upper surfaces of the respective horizontal rail portions support the secondary conductor of the drive and the induction line of the power supplying system. The wheels of the electric car roll on upper ends of the vertical portions of the rails. Each positioning roller is kept in a rotating contact with an inner vertical surface of the corresponding vertical web portion.

Alternatively, each guide rail can have a reversed L-shaped cross section and having a vertical web portion secured to a fixed supporting member, and a horizontal rail portion extending from the upper end of the vertical portion. In this alternative, the secondary conductor of the drive and the induction line of the power supplying system are disposed below the respective horizontal rail portions, the upper surfaces of which support the wheels of the car. Similarly to the first alternative each positioning roller is maintained in rotating contact with an inner vertical surface of the corresponding vertical portion.

The objects of the present invention are further achieved wherein the transportation system further comprises a base plate holding the linear motor body and extending along the guide rails, spacing rollers rotatably attached to the base plate to maintain a constant distance between the linear motor body and the secondary conductor, and an upright guide rod attached to the base plate and vertically displaceably penetrating a bottom frame of the electric car. The spacing rollers are journaled on horizontal shafts arranged along opposite sides of the base plate and at intervals along the guide rails, and each of the guide rods has a free end above the bottom frame of the car, and a stopper secured to the free end to prevent the guide rod from slipping out of the frame.

The linear motor body is suitably placed above the guide rail, with the spacing rollers under gravity bearing against the upper surface of the guide rail. Alternatively, the linear motor body can be placed below the guide rail, with the spacing rollers by magnetic attractive force bearing against a lower surface of the guide rail.

The objects of the present invention are further achieved by the transportation system of the present invention when it is installed in an automated warehouse having a plurality of car passages, a pair of guide rails extending along each side of a car passage, a plurality of transporting electric cars each having wheels supported by the rails and guided therealong, a drive for each electric car, and a power supplying system for the drive in each electric car, wherein the power supplying system is noncontact type power sources having a pair of induction wires connected in series to each other and connected to a common panel. When a larger number of the car passages are involved, they can be grouped into blocks of adjacent, upper and lower car passages. The pairs of induction wires in each block can be connected in series one to another and connected to a common panel.

In summary, the transporting system of the present invention has a linear motor as the drive for the electric car, and a non-contacting inductive power supply so that the noise is reduced in spite of any increase in the speed of the car. This system can operate more reliably, and a much cleaner environment can be kept around the system than in the prior art systems. In particular, the linear motor drive is located on one side of the electric car, whereas the inductive power supplying system is suitably located at the other opposite side of the car. That layout is highly effective to protect the system from mutual magnetic interference and thus to ensure smooth operation of the system. It is a further important feature that the secondary conductor of the drive is suitably horizontally supported by one of the guide rails and the pair of induction wires is also horizontally supported by the other guide rail. Due to this arrangement the overall volume of the system, including the guide rails, is sufficiently small for use in a shelving and unshelving transporting system of automated warehouses.

Upright guide rods support the linear motor body on the transporting electric car and permit the body to ascend and descend within a predetermined travel distance. This enables spacing rollers on the base plate of the linear motor body to be in continuous contact with the surface of the guide rail. Thus, neither the abrasion of electric car wheels nor any obstacles ridden over thereby will cause any problems such as a direct contact between the linear motor body (or induction coils) and the secondary conductor on the guide rail. The motor body can be readily mounted onto or dismounted off the electric car by reversibly inserting the guide rolls in and through openings formed in the bottom of the car frame. This inexpensively simplifies installation of the linear motor body. Moreover, the base plate of motor body has a plurality of the spacing rollers arranged on its sides and along the rails. The spacing rollers are journaled in the respective shafts and keep a constant, small clearance between the motor body and the secondary conductor on the guide rail. The spacing rollers cooperate with the plurality of vertically movable guide rods arranged along the rails, so that the elongated motor body that extends along the full length of electric car is attached to the car in a stable and accurately positioned manner.

The induction wires of the power supplying system are disposed along the car passages and they need not be connected to different panels supplying a high frequency current, but the adjacent upper and lower induction lines can be connected in series one to another to be energized by the single supply panel. Thus, the number of necessary panels is reduced to lower the construction cost, and the cost of wiring.

Although all of the induction lines can be connected in series connected to a single power supply panel, they can also be grouped into a plurality of blocks. The adjacent upper and lower induction lines in each group can be connected in series one to another and to the single panel. Consequently, even if the overall length of the car passages is too large in a large automated warehouse the construction cost can be kept low. In that case, there is no concern that the efficiency of the power supplying system would be impaired due to the excessive length of the induction lines connected to one common panel.

DESCRIPTION OF THE DRAWINGS

The present invention is further described with reference to the drawing wherein:

FIG. 5 is a front elevational view corresponding to FIG. 2, but showing parts on an enlarged scale;

FIG. 6 is a cross-sectional view of a guide rail;

DETAILED DESCRIPTION

Figure 1:
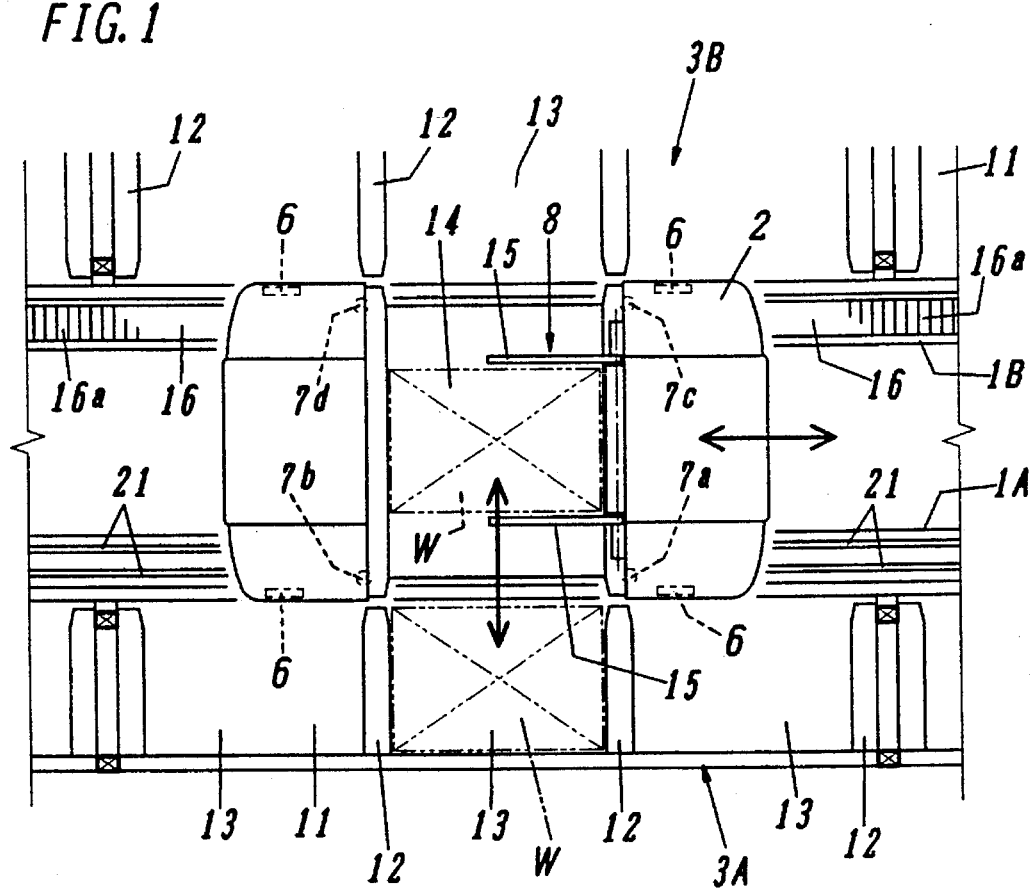
FIG. 1 is an overall plan view of an embodiment of the transportation system of the present invention.
Figure 2:
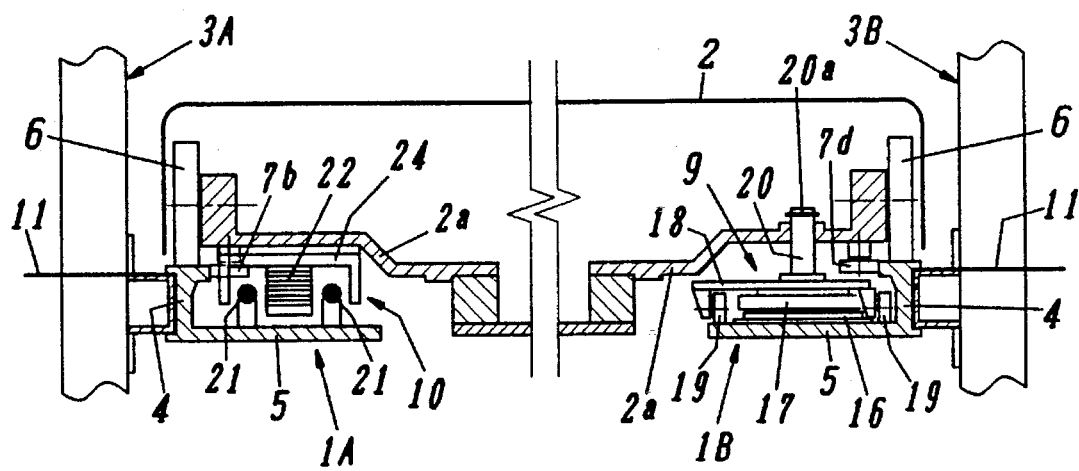
FIG. 2 is a partial cross-sectional view of the system of FIG. 1.

As shown in FIGS. 1 and 2 left and right guide rails 1A and 1B are provided for an electric car 2. The guide rails 1A and 1B are attached from warehouse shelving racks 3A and 3B extending horizontally in a common plane. Each of the guide rails is made of aluminum or the like material, and has an L-shaped cross section with an outer vertical web portion 4 at which the guide rail is secured to the adjacent corresponding shelving rack. A horizontal rail portion 5 of each guide rail protrudes inwardly from a lower end of the vertical web portion 4.

The electric car 2 has four wheels 6 for rolling on and along the guide rails 1A and 1B, and four positioning rollers 7a–7d journaled on respective vertical shafts. Transferring means 8 are provided on the car for shelving and unshelving packaged cargo, a drive 9 for driving the car, and a power supplying system 10 for the drive. The transferring means 8 is adapted transversely to transfer the cargo 'W' between shelves 13 in the racks 3A and 3B and a load platform 14 of the car 2. A pair of liftable swing arms 15 of the transferring means 8 are adapted to grab the cargo 'W' at its front and rear surfaces perpendicular to a direction in which the car 2 can reciprocate to transfer the cargo. Each shelf 13 in the racks 3A and 3B is formed on a base 11, between two adjacent partitions 12.

The linear motor drive 9 has a primary induction member installed in the car 2, and a horizontal secondary conductor 16 is secured to the horizontal rail portion 5 of the guide rail 1B. The drive further comprises a linear motor body 17 disposed below and adjacent to the bottom of the electric car 2. The linear motor body is located facing the conductor 16. As shown in FIGS. 1 and 5, the secondary conductor 16 comprises a plurality of rectangular and flat permanent magnets 16a, the upper and lower surfaces are respectively the N and/or S poles. The upper N poles and the upper S poles of those magnets 16a are arranged along the rail and are attached to a base strip 16b in an alternating manner with one another. A multi-layer material of a nonmagnetic but electrically conductive layer such as of aluminum, and a magnetic and electrically conductive layer such as of steel can be substituted for the row of magnets 16a as the secondary conductor.

Figure 3:
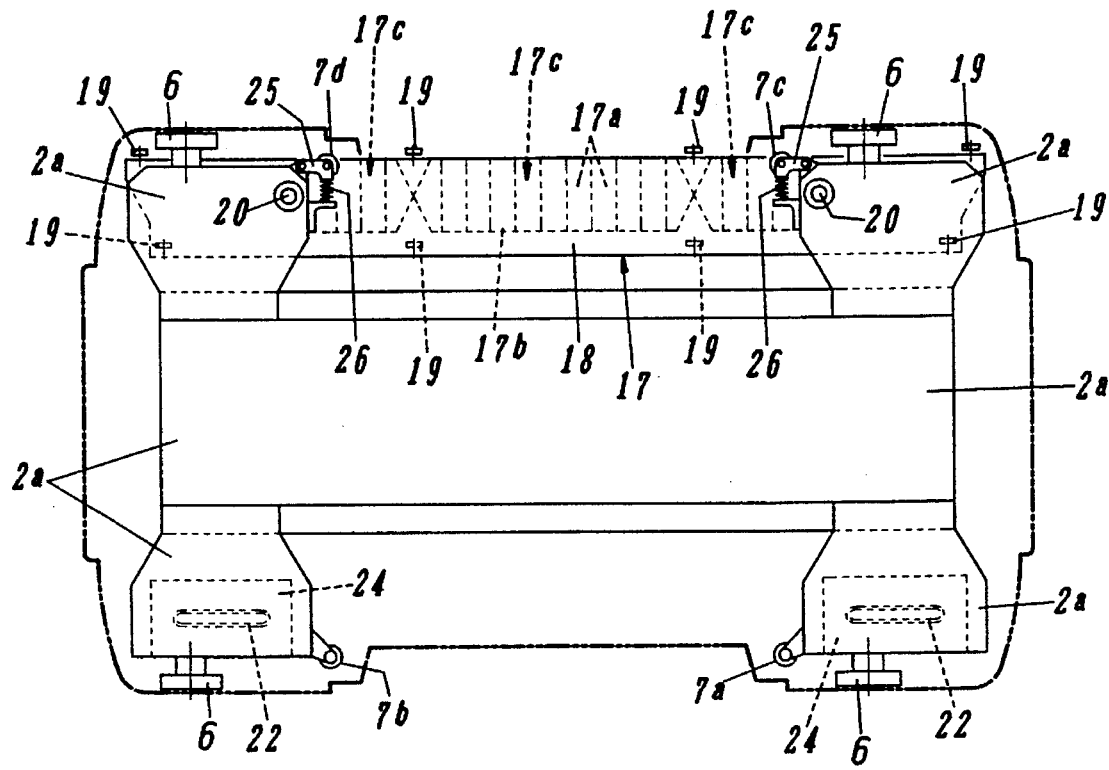
FIG. 3 is a plan view of essential parts of a electric car employed in the system of FIG. 1.
Figure 4:
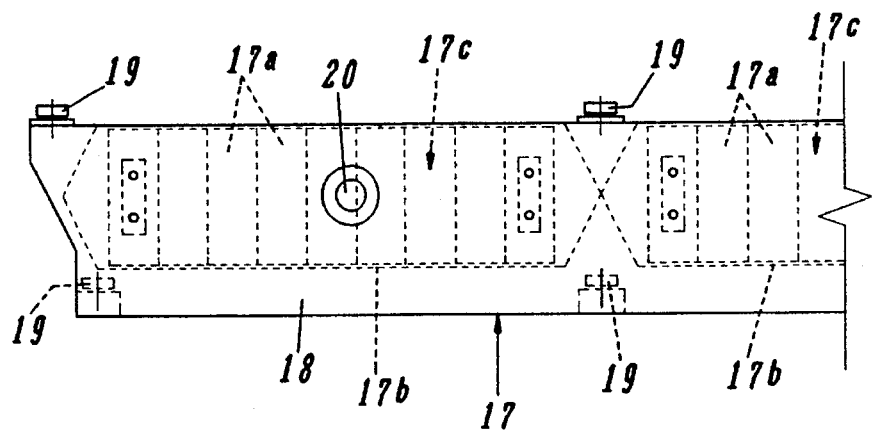
FIG. 4 is a plan view of a linear motor body as the driving system incorporated in the electric car of FIG. 3.

FIGS. 3 to 5 show that the linear motor body 17 comprises a plurality of primary units 17c, three primary units in the embodiment illustrated disposed along the rail. Each of the primary units 17c has a plurality of induction coils 17a which are located side by side below a coil yoke plate 17b and thus forming a series of coils along the rail. The coil yoke plate 17b is disposed below and is attached to a base plate 18 which extends along the rail. Spacing rollers 19 are rotatably supported by horizontal shafts, and are disposed at selected intervals along the opposite sides of the base plate 18. The spacing rollers 19 roll on and along the horizontal rail portion 5 of the guide rail 1B. Vertically diplaceable upright guide rods 20 protrude from two regions of the base plate 18 and are spaced from each other along the base plate. FIG. 2 shows that the guide rods 20 protrude through a frame 2a of the electric car 2 so that they can move up and down in the frame. A stopper ring 20a attached to the upper free end of each guide rod prevents it from slipping out of the frame 2a. The linear motor body 17 can descend under its own weight so that the spacing rollers 19 always abut against the horizontal rail portion 5 of the guide rail 1B. A constant small clearance is thus assured between the linear motor body 17 and the secondary conductor, the upper surfaces of the magnets 16a, facing the motor body.

The power supplying system 10 is a non-contact power source and is shown in FIGS. 2, 3 and 5 comprises a pair of induction or litz wires 21 and two induction coils 22, one located at the front and the other at the rear of the electric car 2. The induction wires 21 are arranged side by side along and extend the guide rail 1A and are secured to a horizontal rail portion thereof, and are spaced from each other along each side of the rail. The two induction coils 22 intervene between the induction wires 21. Supports 23 are located at intervals along the guide rail 1A, and form a row along each induction wire 21. The supports 23 support the induction wires on the horizontal portion 5 of the rail 1A. The induction coils 22 are attached to coil yokes 24 with the yokes being attached to the bottom of the car frame 2a.

As shown in FIG. 5, the four wheels 6 of the electric car 2 roll on and along the upper end surface 4a of the vertical web portions 4 of the guide rails 1A and 1B. The four positioning rollers 7a–7d abut against the upper and inner vertical surfaces 4b of the web portion 4. Two positioning rollers 7a and 7b are in contact with the guide rail 1A along which the power supplying system 10 is located. The positioning rollers 7a and 7b are supported by shafts attached to the car frame 2a. The other two positioning rollers 7c and 7d located near the drive 9 are in contact with the other guide rail 1B. The rollers 7c and 7d are rotatably supported respectively from the movable arms 25, for horizontal displaceability transversely of the guide rail. A spring 26 constantly urges each movable arm 25 so that the rollers 7c and 7d are pressed against the upper and inner vertical surface 4b of the vertical web portion 4.

As a result of that feature, the entire car 2 is urged toward the guide rail 1A where the power supplying system is located. The positioning rollers 7a and 7b are thus forced into a continuous contact with the upper and inner vertical surface 4b of the vertical web portion 4 of the guide rail 1A. Even if a small variation is present in the distance between the guide rails 1A and 1B, causing a slight transverse rocking of the car, its position relative to the guide rail 1A is maintained constant. Thus, the induction coils 22 are always kept at their correct position relative to the induction wires 21.

Suitably, a detectable plate 27 and a cam 28 are attached to the guide rail 1A at the power supplying system 10 to act on limit switches for accurate control of the car 2. Photoelectric sensors 29 are attached to the electric car 2 horizontally facing the detectable plate 27 sideways.

The guide rails 1A and 1B are of the same shape, and are disposed symmetrically opposite to one another. As shown in FIG. 6 an outer side of each vertical web portion 4 has a plurality of parallel grooves 30 formed one above another. Tapped plates and/or nuts inserted in the grooves are slidable along the guide rail in the grooves 30 to mate bolts of the like which fasten the guide rail to the shelving racks 3A or 3B at any desired location along the guide rail. The guide rail has further horizontal grooves 31 formed in the horizontal rail portion 5, some of them located on the upper side of the rail portion, and others opening downwardly at an inner edge of the portion. The grooves 31 are suitably used to hold tapped plates and/or nuts at any location along the guide rail for fastening the secondary conductor 16 of the drive 9, the hangers 23 for the induction wires 21 in the power supplying system 10, the detectable plate 27, and the cam 28. A yet further groove 32 is formed along a base region of the horizontal rail portion 5, opens inwardly to receive an end of the base strip 16b holding the magnets 16a of the secondary conductor 16.

In operation of the systems as constructed above, a high-frequency current supplied to the induction wires 21 in the power supplying system 10, produces a magnetic field around the wires. An electromotive force is generated by that magnetic field, in the induction coils 22 attached to the electric car 2. In other words, the power supply to the electric car 2 is effected by the induction wire lines 21 and through the induction coils 22 without frictional electrical contact. The linear motor body 17 of the drive 9 receives the thus induced current, and this causes a magnetic reaction between the motor body 17 and the secondary conductor 16. This magnetic reaction brings about either a repellant, or an attracting force of the desired direction and thus the electric car 2 is made to move forward or backward along the guide rails 1A and 1B.

Figure 7:
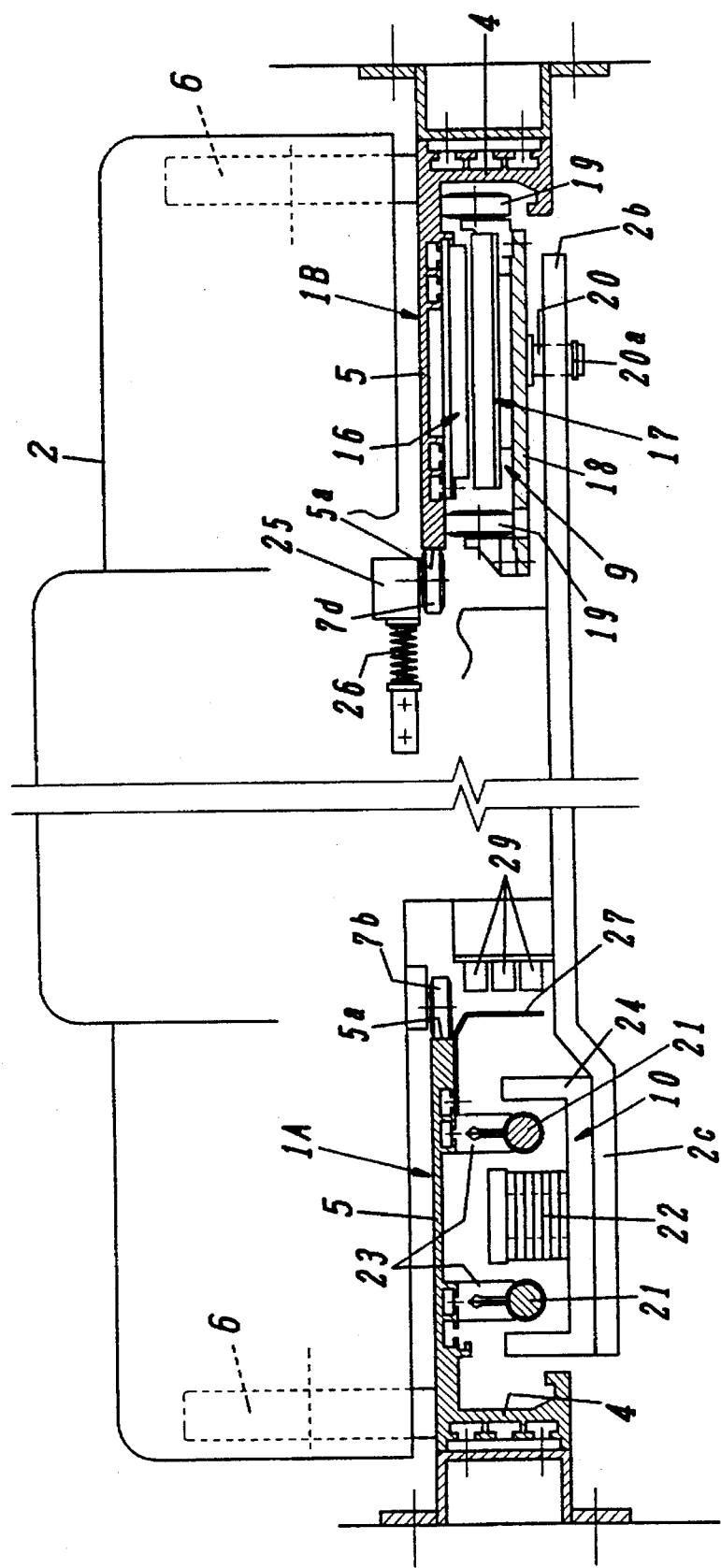
FIG. 7 is a front cross-sectional view of a modified embodiment of the system.

FIG. 7 shows a modified embodiment in which the guide rails 1A and 1B are both reversed, facing upside down. In this embodiment, each horizontal rail portion 5 extends inwardly from the upper end of the vertical web portion 4, so that the wheels 6 of the electric car 2 roll on the upper side of those horizontal portions. The positioning rollers 7a–7d are kept in contact with the inner vertical surfaces of the horizontal rail portions 5. The secondary conductor 16 in the drive 9, and the induction wires 21 in the power supplying system 10 are disposed below the horizontal portions. Correspondingly, bottom frames 2b and 2c of the electric car 2 are cantilevered beneath the guide rails 1A and 1B. The linear motor body 17 and the induction coils 22 for the power supplying system 10 are supported from the bottom frames.

In this modified embodiment of FIG. 7 the magnetic attraction between the secondary conductor 16 and the linear motor body 17 urges the motor body upwardly. The spacing rollers 19 rotatably attached to the base plate 18 supporting the motor body 17 contact the lower surface of the horizontal rail portion 5 of the guide rail 1B. Similarly to the first described embodiment, the clearance between the motor body 17 and the secondary conductor 16 is kept constant. Upon disconnecting the power, the linear motor body 17, descends to its lowest home position.

The cargo transferring means 8 in the described embodiments involved the swing arms 8, the electric car can be equipped with any other cargo transfer means such as a running fork, or the car can have a stacker-crane with a liftable carriage.

The shelving racks 3A and 3B can have their shelves arranged three dimensionally. In other words, the shelves in each rack can be arranged not only horizontally along the passage of the car 2, but can also be arranged above and below the passage. If the car 2 has load transfer means 8 capable of transferring the wares only between the car and an adjacent shelf 13, then car passage (i.e. pairs of the guide rails 1A and 1B) must be provided for each horizontal row of the vertically arranged shelves 13, resulting in the automated warehouse.

Figure 8:
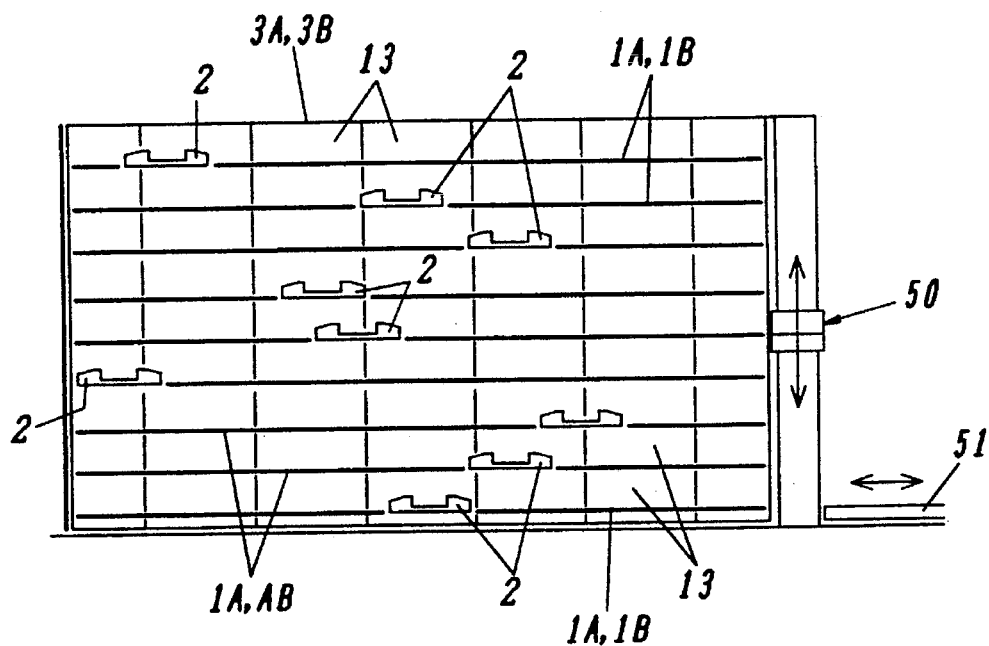
FIG. 8 is a schematic side view of an automated warehouse containing a plurality of upper and lower car passages.

For example, as shown schematically in FIG. 8 one pair of guide rails 1A and 1B define one passage for the car 2, and can be provided for each horizontal row of shelves 13. In this case, a car 2 is used, for each passage. An elevator 50 at one end of the rows of the shelves, and a conveyor 51 for storing and delivering the goods can be connected to a lower end of the elevator 50.

The goods to be stored in the shelving racks 3A and 3B are transported by the conveyor 51 into the elevator 50, and are then raised to a level corresponding to the shelf 13 to receive the goods. The car 2 serving the same level as the particular shelf 13, takes the cargo from the elevator 50, and travels to the location of the shelf 13 in the shelving rack 3A or 3B. The cargo transferring means 8 then moves the cargo from the load platform 14 of the car onto the shelf 13. Delivery of the goods out from the warehouse is by carrying out these steps in the reverse order.

Figure 9:
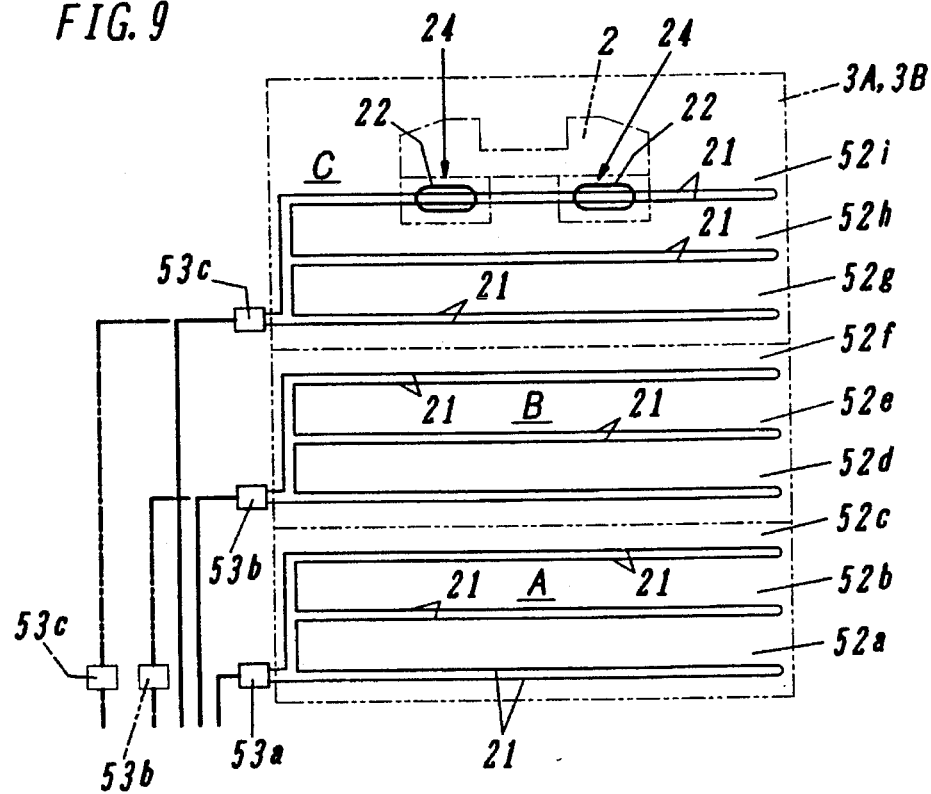
FIG. 9 shows a non-contact type power supplying circuit in the automated warehouse of FIG. 8.

As shown in FIG. 9, in the described automatic warehouse, car passages 52a–52i located one above the other can be grouped into blocks 'A'–'C' each comprising a plurality of neighboring passages, i.e. three passages in the illustrated example. One pair of induction wires 21 are installed in each car passage. The pairs of those wires in each block are connected in series and to a common power supply panel 53a, 53b, or 53c. Those panels are suitably located at respective height levels that correspond to the blocks 'A'–'C'. Alternatively, all the panels are placed at the ground level as shown in FIG. 9 by dot-dash lines. Suitably the number of car passages in each group is so selected that the overall length of the induction lines connected in series does not detrimentally affect the efficiency of inducing the electromotive force.

The automated warehouse shown in FIG. 8 comprises the passages for the cars 2 wherein each passage corresponds to a single row of shelves 13 in the shelving racks 3A and 3B. The number of passages for the car 2 can however by smaller than the number of rows of shelves 13, if cars 2 with stacker crane are employed wherein each liftable carriage of each car can service a plurality of shelves 13 one above the other.

We claim:

1. An automated warehouse system comprising a transport unit having
   (i) a car for running on the upper surfaces of first and second rails disposed parallel to each other with each rail having a vertical webbing with inner and outer surfaces, and each rail further having horizontal upper and lower surfaces, a bottom, one side and an other side,
   (ii) a pair of wheels disposed respectively at said one and said other sides for running said car on said rails,
   (iii) a drive for moving said car on said first and second rails, and having
      (a) a linear motor body attached from said car, and facing
      (b) a horizontally disposed secondary conductor secured to said first rail,
   (iv) a power supplying system for supplying power to said drive, mounted from one side of said car, and having
      (a) two horizontally and parallel disposed induction wires secured to and along said second rail, and
      (b) at least one induction coil attached to said car and disposed between said induction wires,
   (v) two pairs of positioning rollers, one pair being attached at one side from and along the car substantially transversely from the pair of rollers attached from the other side, and
   (vi) a plurality of vertical shafts each for rotatably supporting one of said rollers for contact between each roller with an adjacent inner surface of an adjacent said rail, the rollers at said one side of the car being maintained in a fixed position relative to said car, and the rollers at the other side being urged horizontally movably within a predetermined range, against the inner surface of the adjacent rail.

2. The warehouse system of claim 1, wherein said first and said second rails each have a substantially L-shaped cross section, said secondary conductor is attached to said upper horizontal surface of said first rail, and said induction wires are supported in substantially fixed positions from said second rail.

3. The warehouse system of claim 1, wherein said first and said second rails each have a substantially reversed L-shaped cross section, said upper horizontal surface forming one leg of said reversed L-shape, with said wheels adapted to run thereon, and said secondary conductor and said induction wires are disposed under respective said horizontal surfaces of said rails.

4. The warehouse system of claim 1, comprising
   (i) a plurality of car passages,
   (ii) said first and second rails disposed parallel to each other in each of said car passages, and
   (iii) a plurality of said transport units each, disposed in each of said car passages,
   (iii) said induction wires of each of said transport units being connected in series to one or more common panels.

5. The warehouse system of claim 4, further comprising a plurality of shelving racks having shelves stacked therein, at least one of said car passages extending along said shelving racks.

6. The warehouse system of claim 4, wherein selected ones of said car passages are grouped into a block and are mutually vertically arranged, said induction wires of the car passages of each block being connected in series to each other and to a common panel.

7. An automated warehouse system comprising a transport unit having
 (i) a car having a bottom, one side and an other side,
 (ii) a pair of wheels disposed respectively at said one and said other sides for running on first and second rails disposed parallel to each other with each rail having a vertical webbing with inner and outer surfaces, and each rail further having horizontal upper and lower surfaces,
 (iii) a drive for moving said car on said first and second rails, and having
   (a) a linear motor body attached from said car, and facing
   (b) a horizontally disposed secondary conductor secured to said first rail,
 (iv) a power supplying system for supplying power to said drive, mounted from one side of said car, and having
   (a) two horizontally and parallel disposed induction wires secured to and along said second rail,
   (b) at least one induction coil attached to said car and disposed between said induction wires,
 (v) an elongated base plate attached from the bottom of said car with the elongated dimension being substantially parallel to said sides of the car,
 (vi) at least two spacing rollers attached from said base plate for maintaining a predetermined clearance between said linear motor body and said secondary conductor,
 (vii) vertical guiding rods attached to said base plate in the elongated direction thereof and movably ranging through the bottom of said car, and
 (viii) stoppers each attached to the top end of each of said guiding rods for preventing each rod from slipping out from the bottom of the car.

8. The warehouse system of claim 7, wherein the linear motor body is disposed above one of the rails so that said spacing rollers bear against said horizontal upper surface under gravity.

9. The warehouse system of claim 7, wherein said first and said second rails each have a substantially reversed L-shaped cross section, said linear motor body is located below one of the rails and said spacing rollers bear against said lower surface due to magnetic attraction.

* * * * *